Dec. 4, 1962  R. A. PROSSER  3,066,920
BLENDING APPARATUS FOR PARTICULATE MATERIALS
Filed July 13, 1959  2 Sheets-Sheet 2

INVENTOR.
RAE A. PROSSER
BY
*Walter C. Kehm*
ATTORNEY

United States Patent Office 3,066,920
Patented Dec. 4, 1962

3,066,920
BLENDING APPARATUS FOR PARTICULATE
MATERIALS
Rae A. Prosser, South Charleston, W. Va., assignor to
Union Carbide Corporation, a corporation of New
York
Filed July 13, 1959, Ser. No. 826,634
4 Claims. (Cl. 259—180)

This invention relates to apparatus for blending particulate materials. More particularly, it relates to apparatus comprising a novel arrangement of baffles in ordinary storage equipment which effectively blends particulate material in the course of routine handling.

Processors of plastics have long been plagued by erratic extrusion and molding characteristics in resin batches shipped from manufacturers. Their experience has been that the properties of resin contained in even a single shipment can vary significantly. A sudden change in properties during formation of film with high speed machines will cause fracture or a breaking of the film, or cause a haze to develop therein; similarly in injection molding, partial filling of molds is the likely result of resin variations. Obviously, these failures are costly to the processor and ultimately to the manufacturer.

Variations in resin properties from batch to batch are inherent in presently known manufacturing techniques where polymerization conditions are not prefectly reproducible. After manufacture, the diced, granulated or otherwise particulated resin is conveyed to large storage bins or hoppers where successive additions form contiguous layers. In the usual manufacturing plant particulate material is reconveyed several times to different bins in the course of routine handling. Despite a number of transfers from bin to bin the stratified condition of bin contents is only slightly changed. Blending of adjacent layers of material is nearly negligible. The usual shipment of resin to a processor represents only a portion of the bin contents and more likely than not several strata differing incrementally will be shipped. The result is insidious and unpredictable changes in processing behavior and unsatisfactory performance.

Although the properties of the resin in the different strata do not widely or ordinarily critically vary, changes in resin quality can and do occur. Because the changes are generally incremental, they are not readily noticed and the result is the possible use of a large quantity of resin in making a substandard product. While it is true that timely adjustment of temperature and pressure on the fabricating equipment can avoid this result, the incremental nature of the changes makes them difficult to detect until their cumulative effect is apparent. Uniform blending of the differing materials would eliminate this problem.

Methods presently used by resin manufacturers to blend superposed contiguous layers of particulate material are broadly divisible into power operated devices and gravity operated devices.

The first group includes tumbling blenders, such as double cone blenders, and deep flight screws. The former device is well adapted to blending great quantities of resin material but it is extremely expensive initially and cannot double conveniently as a storage bin since it must be kept available for blending use, and storage bins are also required. The latter device is effective only with undesirably long mixing times. Both of these devices, which are typical of power operated blending equipment, are costly to install, space consuming, require operators and continual maintenance and also additional conveying equipment.

Gravity operated devices are commonly specially constructed bins or hoppers usually possessing a critical feature such as a particular slope for the walls, restricted number and depth of contiguous layers, etc. These devices are economical to operate and maintain, but are sometimes expensive to construct, particularly in existing facilities. It has been found, however, that known gravity operated blending hoppers used in coal industries and the like lack the flexibility required by resin manufacturers. The blending problem encountered in the resin industry involves averaging out of minor changes in properties to eliminate the above-described insidious variations encountered in fabrication. Therefore, blending hoppers which are based on the principle of carefully arranged layers of material of known composition are unsuited to resin blending.

To produce an acceptably uniform blend, it is necessary to intimately commingle all the component resins. Suitable equipment must positively intermix all the contents of the bin regardless of their respective proportions within the bin. Important too, is accomplishing such intermixing and blending with as few extra handling steps as possible, and preferably with no extended handling beyond the ordinary routine handling accorded every batch of resin.

It is an object, therefore, of my invention to provide blending apparatus having a novel arrangement of baffles adapted to achieve very nearly homogeneous blends of particulate materials.

It is another object to provide apparatus which inexpensively and efficiently blends great quantities of particulate material without benefit of powered agitation.

A further object is to provide a storage bin having a novel arrangement of baffles whereby material entering the bin is blended with the other contents of the bin upon discharge therefrom without significant reduction in bin capacity.

It is still another object to blend particulate resin materials adequately almost completely during the routine handling thereof.

These and other objects are accomplished in accordance with my invention by the use of a blending apparatus comprising a cylindrical chamber having concentrically disposed therein a plurality of superposed, divergent cone-like baffles which have an axial flow path therethrough and which define a plurality of annular clearances with said chamber.

A full description of my invention is given hereinbelow in conjunction with the attached drawings wherein:

FIG. 4 is an enlarged detail view of a portion of FIG. 1.

Figure 1:
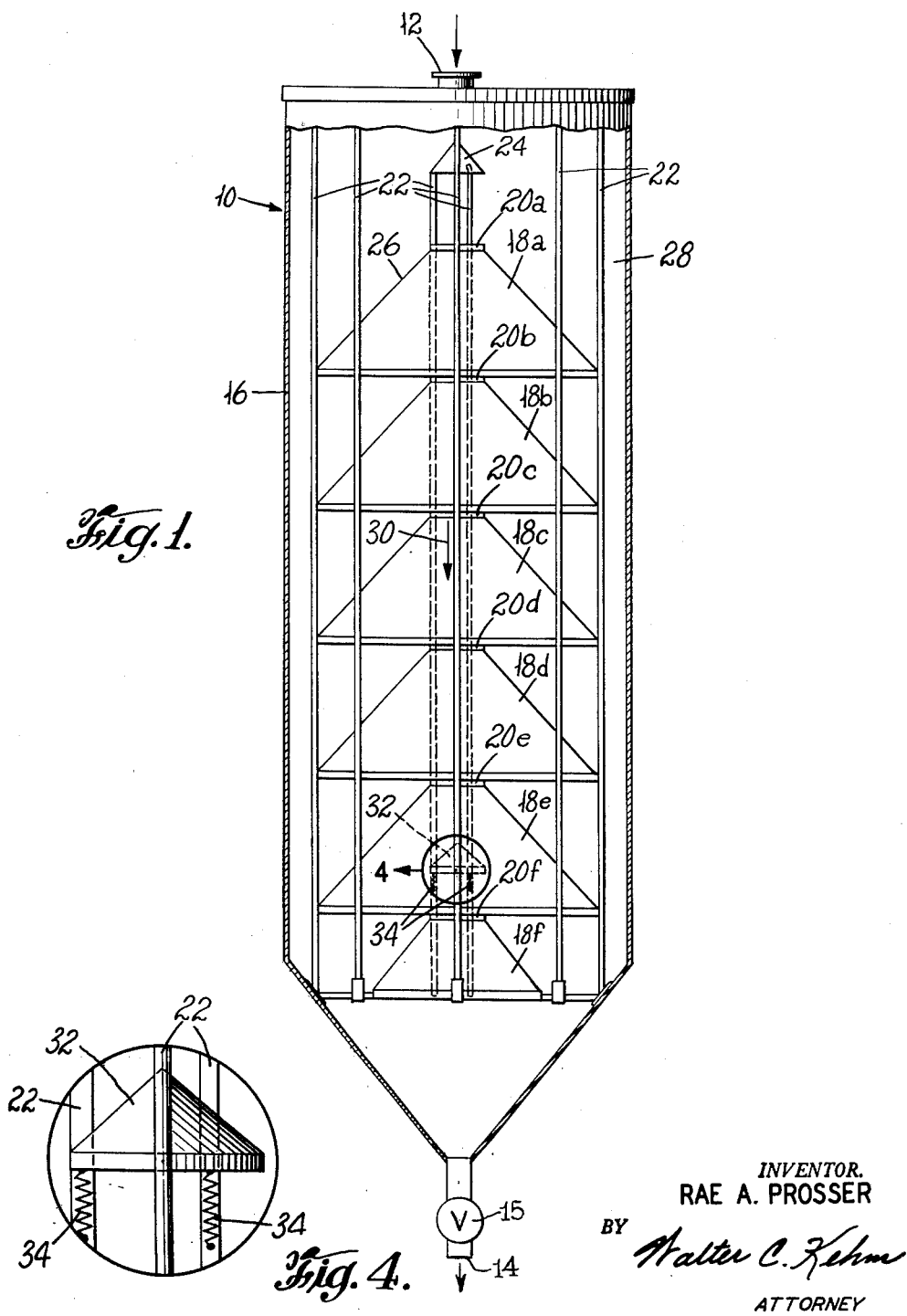
FIG. 1 is a sectional view, partly in elevation, of a preferred embodiment of the apparatus.

Referring to FIG. 1 the apparatus comprises a chamber 10 of cylindrical cross section representative of a silo, hopper, bin, tank or the like having an opening 12 at the top, an outlet 14 at the bottom and a wall 16 extending therebetween. Outlet 14 is provided with means for controlling the rate of outflow of material from the chamber 10. Typically, outlet 14 is provided with a conventional valve 15, or outlet 14 can be provided with an opening of a cross-section which retards to a greater or lesser degree egress of material for purposes more fully explained hereinafter. Concentric with the chamber 10 are a plurality of inverted cone-like baffles superposed and coaxially vertically spaced one above the other. Six baffles 18a, 18b, 18c, 18d, 18e and 18f are shown in FIG. 1. This is the preferred number of baffles, but as few as four or less or as many as eight or more baffles are also suitable.

The cone-like baffles 18a, etc., are truncated at their apices to provide respectively central openings 20a, 20b, 20c, 20d, 20e and 20f therein which are in registry one with another to define a flow path 30 through the baffles. The size of the openings is not narrowly critical but should be large enough to permit relatively unimpeded flow of particulate resin material disposed in the chamber 10 therethrough. Cone-like baffles 18a, etc. are suitably braced by vertically extending rod, bar or strap braces or radially extending braces or both. Vertically extending pipe braces 22 are preferred and illustrated herein. I prefer to employ braces 22 circumferentially spaced about both the outer and inner peripheries of baffles 18a, etc.

An upper deflector 24 is fixed on braces 22 above uppermost baffle 18a whereby particulate material entering chamber 10 through inlet 12 is diverted from opening 20a in baffle 18a and directed downward past and not through opening 20a. The so-directed particulate material impinges upon the upper surface 26 of baffle 18a which is pitched at an angle greater than the angle of repose of the material entering through inlet 12. Material thus impinging slides off upper surface 26 and falls through the annular clearance 28 between the periphery of baffle 18a and wall 16 of chamber 10. Referring to illustration (a) of FIG. 2, first added particulate material (represented by x's) comes to rest at the bottom of chamber 10 against closed valve means 15. As is evident, build-up of x material occurs where the rate of outflow of or egress of material is controlled to less than the rate of ingress whether such rate of outflow is controlled by a closed valve, a partially open valve or an opening of a diameter such as prevents material outflow at a rate equal to material addition at the top of the bin and additional material x fills the annular clearance between successively higher baffles. The particulate material is confined between wall 16 of chamber 10 and the upper surface of the adjacent baffle below. The amount of material lodged on the upper surface of a baffle is dependent upon the relative pitch of the surface and the relative angle of repose of the material. When addition of x material reaches a point where the accumulation covers upper surface 26 of baffle 18a as shown in illustration (b) of FIG. 2, any material added thereafter, upon being diverted by deflector 24, impinges almost immediately against material x and is directed thereby under deflector 24 into opening 20a centrally located in baffle 18a. This latter added particulate material for purposes of illustration is shown as darkened o's. Material o falls through the flow path 30 defined by the openings 20a etc. in baffles 18a, etc. toward the bottom of chamber 10.

A lower deflector 32 is fixed on vertical braces 22 in the flow path 30 above the lowermost baffle 18f to divert material outward away from the opening 20f in baffle 18f and thereby prevent material o from falling directly into outlet 14 from opening 20a thereabove. Material o fills the space between baffle 18e and 18f and then simultaneously fills the spaces above and below lower deflector 32. As indicated in the drawing, some material o strikes the upper surfaces of the baffles and slides against the material x reposing thereon.

The lower deflector 32 is preferably movably mounted as shown in FIG. 4. Deflector 32 rests on heavy springs 34 which compress during withdrawal when sufficient material rests upon lower deflector 32 and no support is received from material under the deflector. The springs 34 are designed to allow complete closure of the opening 20f in lowermost baffle 18f when during emptying of the bin, the particulate material under the deflector 32 supporting it, is removed. The closed position of lower deflector 32 is shown in FIG. 2(b) with the requisite absence of material in the space thereunder. Ordinarily in a filled bin this volume would be filled.

Figure 2:
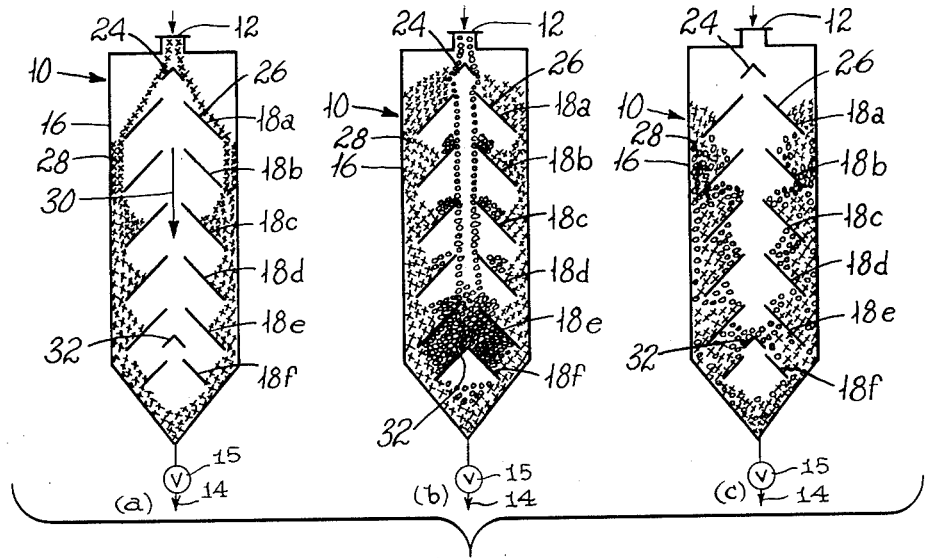
FIG. 2 is a schematic view of the apparatus (a) when filling is begun, (b) when nearly full and (c) when partially emptied.

Illustration (c) of FIG. 2 is representative of the apparatus partially emptied. The material x and material o are drawn off simultaneously through outflow control means and outlet 14 as material flows through the annular clearances toward the outlet 14 from the upper surfaces of all the baffles, e.g., from upper surface 26 of baffle 20a through annular clearance 28. FIG. 2 is merely illustrative of the novel blending action obtained with my apparatus and it is to be understood that there is no limit on the number of components added or mixed together.

I prefer to use several passes through chambers equipped with baffles in order to achieve adequate homogenity of component materials and a uniform blend. Another advantage of my invention is that the majority of the several necessary passes, 4 to 8, is accomplished during routine changing of material from bin to bin during handling prior to shipment, provided each bin is equipped with baffles as above described. Usually, only one or two extra passes are needed to complete effective blending.

Figure 3:
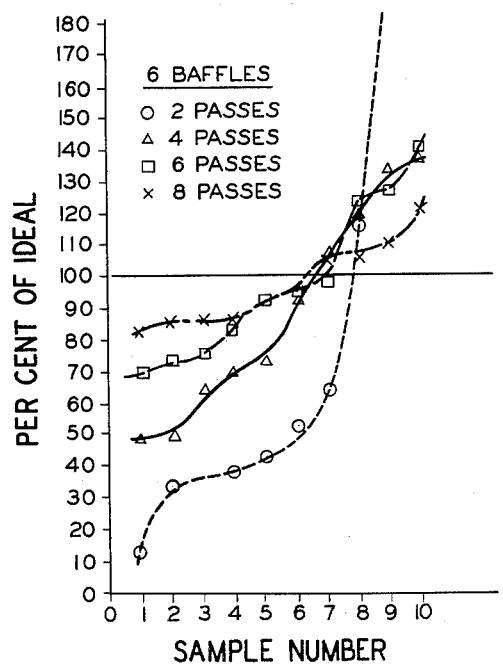
FIG. 3 is a graph of the blending obtained with apparatus of my invention.

FIG. 3 shows the effect of varying the number of passes through the six baffle bins hereinabove described. The data was obtained by filling the chamber with white pellets or granules and adding five standard measures of black pellets which all together amounted to less than 5% of the total volume of white pellets at the top of the chamber. The same standard measure was used as the sampling standard. For purposes of this example the samples were taken after each two complete passes through the chamber. Flow through the chamber was entirely by gravity. The ratio of black to white pellets was such that the ideally proportioned sample contained 32 black pellets. In interpreting the graph the extremes of variation are the significant figures.

For sampling purposes, ten separate tests were run and the black pellets in the sample drawn counted. The points above sample Number 1 on the abcissa of the graph are not necessarily the first drawn samples after the number of passes indicated by the legend on the graph. The results are plotted in increasing number of black pellets without regard to the chronological order of the sample. The percent of ideal achieved by the composition, where 100% equals 32 black pellets per measure, is shown on the ordinate of the graph.

As shown in FIG. 3, the samples drawn after only 2 or 4 passes are not all very well blended, but those drawn after 6 or 8 passes are all adequately blended samples. The amount of variation in samples from the first to the last is the critical factor in achieving adequate blends. Taking the horizontal line marked 100% of ideal as a standard, it will be noted that samples drawn after only two passes had widely divergent extremes of composition and that the divergence of extreme samples decreased as eight passes per sample were approached, and was least at eight passes per sample. It is evident that with the six baffled bin used for these tests eight passes provide the most ideal, i.e., most effectively uniform blend of the components and six passes are adequate. I have found that additional passes do not for all practical purposes improve the degree of homogeneity of the blend sufficiently to justify the extra handling involved. The use of fewer baffles generally results in poorer, i.e., less uniformly homogeneous blends. The use of seven or eight baffles improves over six baffles the blend obtained at a given number of passes but not greatly. The use of six baffles and eight passes is most preferred in apparatus of my invention.

It should be pointed out the geometry of the baffle-containing structure is in part determinative of the ideal number of baffles. For example, a tall bin of small cross section requires a greater number of baffles, perhaps 16 or more, than a short bin of relatively great cross section which would require fewer than four baffles.

In some embodiments of my apparatus such as offcenter feed to the bin, the upper deflector can be conveniently dispensed with, if desired.

There are many obvious modifications of my invention. For example, the cone-like baffles need only downwardly diverge, i.e., have the widest portion lowermost to be operative. Variations in cone slope and maximum cone diameters from bin to bin or in the same bin are feasible provided adequate blending is not precluded thereby. Similarly, deviations in the upper surface of the cones, e.g., a series of ridges thereon, are within the scope of my invention. I do not intend my invention to be limited to the specific embodiment and modifications mentioned herein but rather only as defined in the appended claims.

What is claimed is:

1. An apparatus for blending particulate, free-flowing, granular material utilizing both central and peripheral flow, comprising a cylindrical chamber having an inlet and an outlet provided with means for controlling outflow of material, and concentrically disposed in said chamber a plurality of downwardly divergent cone-like baffles superposed and vertically spaced with respect to each other, each of said baffles having an opening at the apex thereof to define a central flow path in the cylindrical chamber, said cylindrical chamber having a diameter greater than said baffles to define a plurality of annular clearance spaces, the uppermost baffle having a deflector adjacently spaced above the opening therein, whereby material introduced into the chamber is channeled by said baffles through the annular clearance spaces and is controlled in its rate of outflow by said means in the outlet to the point where the accumulation of material adjacent said annular spaces directs additionally added material to said central flow path, thereby forming at the outlet of the chamber a blend of material from the annular clearance spaces and from the central flow path.

2. An apparatus for blending particulate, free-flowing, granular material utilizing both central and peripheral flow, comprising a cylindrical chamber having an inlet and an outlet provided with means for controlling outflow of material, and concentrically disposed in said chamber a plurality of downwardly divergent cone-like baffles superposed and vertically spaced with respect to each other, each of said baffles having an opening at the apex thereof to define a central flow path in the cylindrical chamber, said cylindrical chamber having a diameter greater than said baffles to define a plurality of annular clearance spaces, the uppermost and lowermost baffles each having a deflector adjacently spaced above their respective openings, whereby material introduced into the chamber inlet is deflected by the upper deflector away from the central flow path and is channeled by said baffles through the annular clearance spaces and is controlled in its rate of outflow by said means in the outlet to the point where the accumulation of material adjacent said annular spaces directs additionally added material to said central flow path under said upper deflector, thereby forming at the outlet of the chamber a blend of material from the annular clearance spaces and from the central flow path.

3. Apparatus claimed in claim 1 wherein the number of said baffles is at least 4 and no more than 8.

4. Apparatus claimed in claim 1 wherein said deflector adjacently spaced above said lower baffle is vertically movably mounted on pressure responsive support means above said lower baffle and is adapted to close said opening in the apex of said baffle in response to pressure exerted on said deflector by said material disposed in said chamber.

References Cited in the file of this patent

UNITED STATES PATENTS

| | | |
|---|---|---|
| 741,831 | Provost | Oct. 20, 1903 |
| 1,047,680 | Mills et al. | Dec. 17, 1912 |
| 1,109,725 | Whitney | Sept. 8, 1914 |
| 1,224,656 | McCandliss | May 1, 1917 |
| 1,383,921 | Fredel et al. | July 5, 1921 |
| 2,361,151 | Reed | Oct. 24, 1944 |
| 2,697,881 | Kelley | Dec. 28, 1954 |